Figure 8:
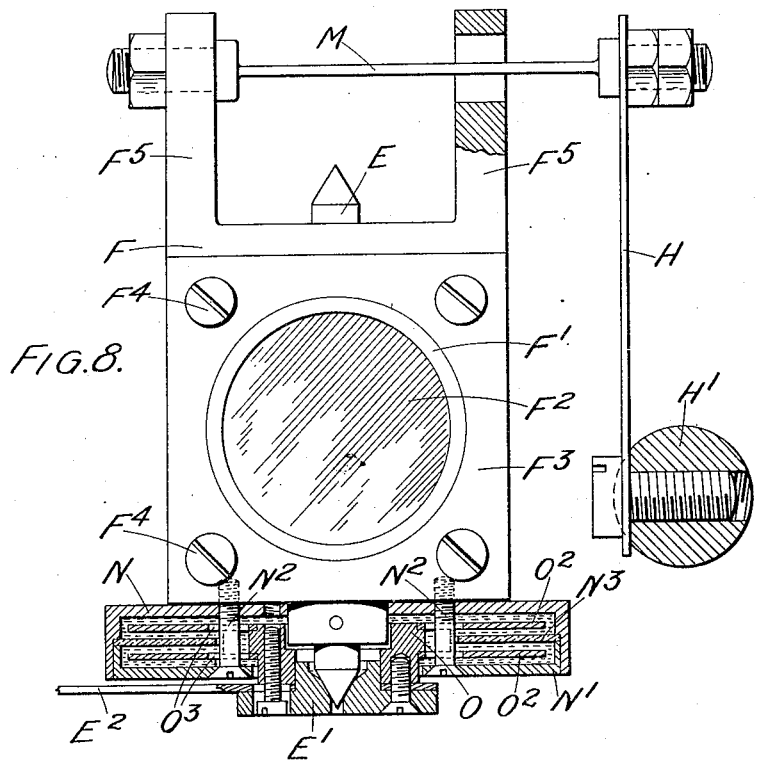

Oct. 4, 1932.    L. G. P. THRING    1,881,301
TORSION METER
Filed Aug. 27, 1931    4 Sheets-Sheet 1
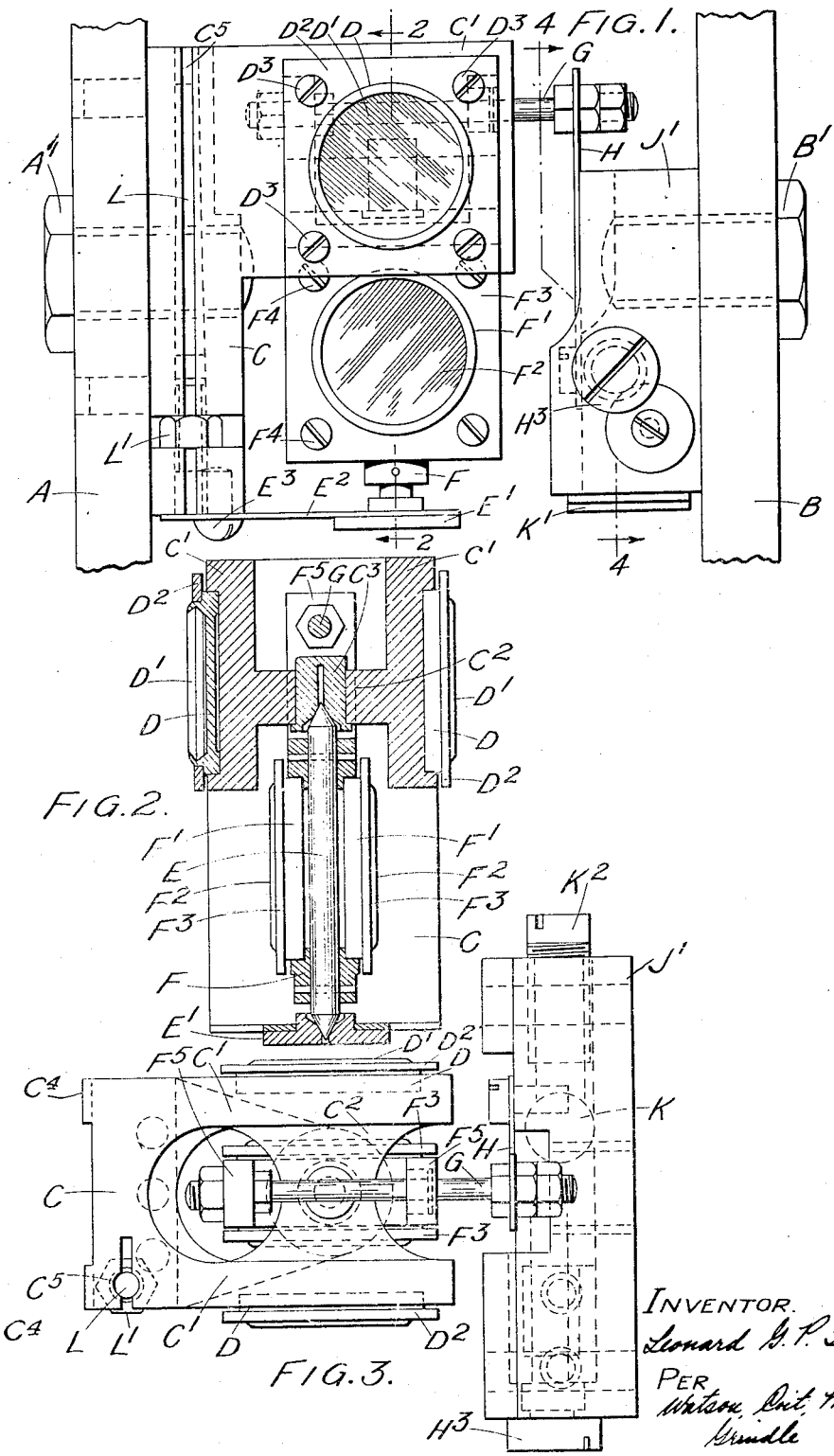

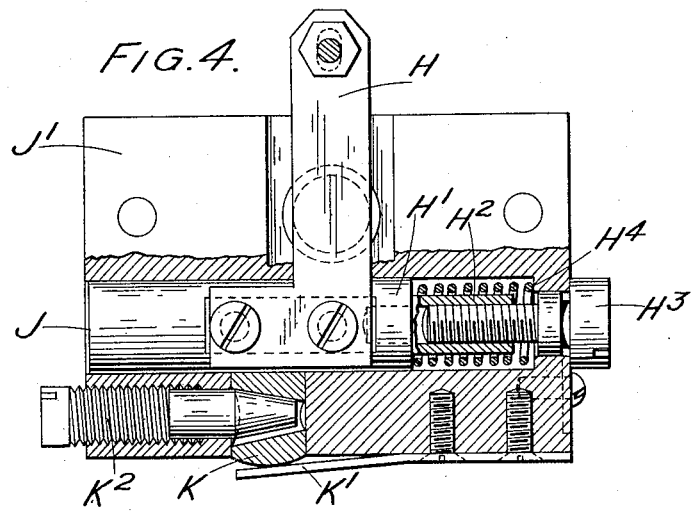
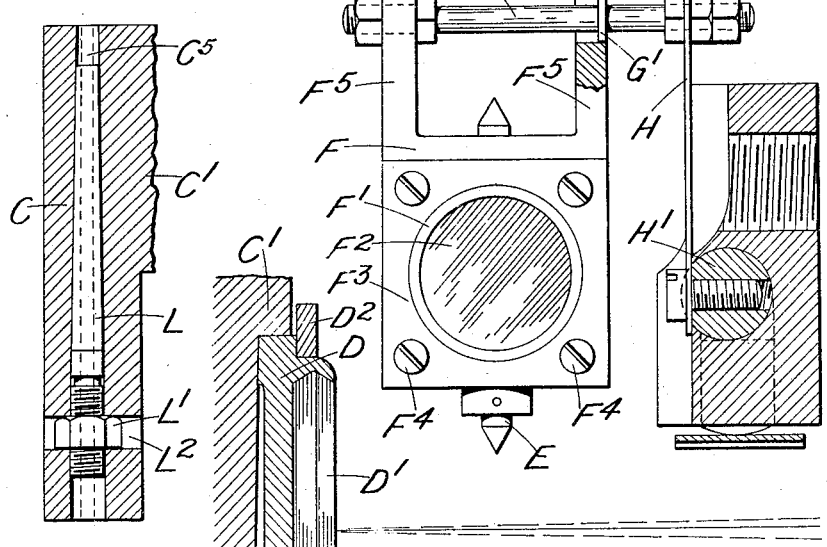
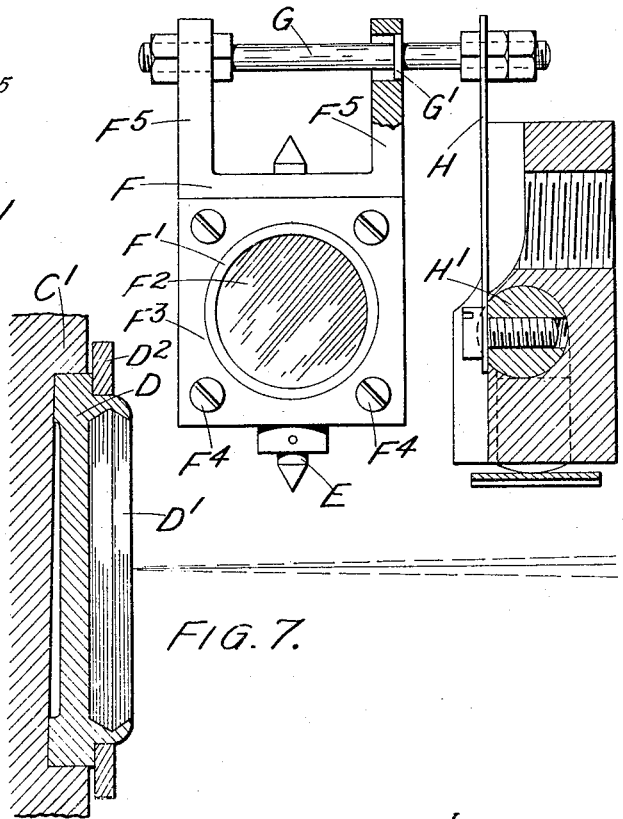

Oct. 4, 1932.  L. G. P. THRING  1,881,301
TORSION METER
Filed Aug. 27, 1931   4 Sheets-Sheet 3

INVENTOR.
Leonard G. P. Thring,
PER.
Watson, Coit, Morse & Grindle
Atty.

Oct. 4, 1932.    L. G. P. THRING    1,881,301
TORSION METER
Filed Aug. 27, 1931        4 Sheets-Sheet 4
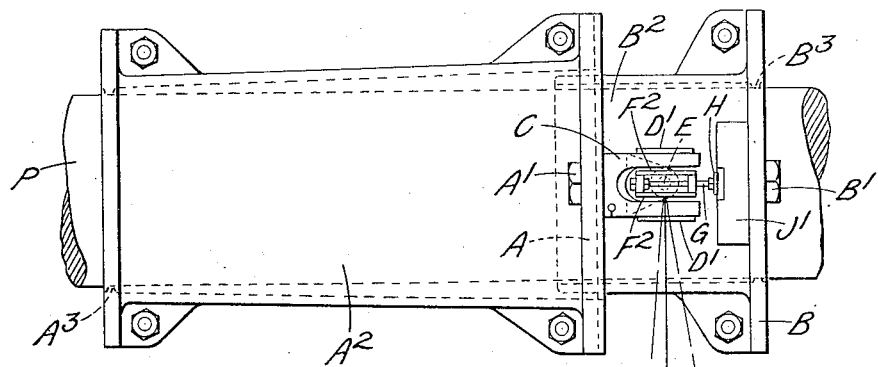
FIG. 10.
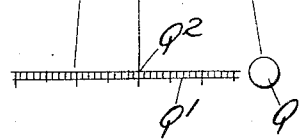
Inventor
Leonard G. P. Thring
By Watson, Coit, Morse & Grindle
Atty.

{ # UNITED STATES PATENT OFFICE

LEONARD GODFREY PINNEY THRING, OF CAMBRIDGE, ENGLAND

TORSION METER

Application filed August 27, 1931, Serial No. 559,783, and in Great Britain September 5, 1930.

This invention relates to torsion meters or instruments for measuring the power being transmitted by a revolving shaft, of the kind comprising two parts (hereinafter termed body parts) adapted to be clamped to the shaft respectively at points a suitable distance apart, the torsion being indicated by one or more light rays reflected from a mirror pivotally mounted on one of the body parts and so connected to the other body part that it moves in accordance with relative rotary movement between the two body parts, a second mirror, termed a zero mirror, being rigidly mounted on one of the body parts so as to provide a zero light ray forming a datum line from which the movement of the movable light ray can be read.

The object of the invention is to provide certain improvements in torsion meters of the above kind.

In a torsion meter of the kind referred to according to the present invention, two zero mirrors are provided and are so mounted on a common support adapted to be rigidly connected to one of the two relatively movable body parts of the torsion meter as both to lie truly at right angles to a single plane, while means are provided whereby the support can be adjusted relatively to the body part on which it is mounted so as to enable this plane to be caused to coincide with that in which the mirrors rotate with the body part. Preferably two moving mirrors are provided, these mirrors being mounted on a second and movable support pivotally carried by the first support so as to lie back to back and truly at right angles to a single plane in which lies the axis about which they pivot. The perfect adjustment of the mirrors relatively to their supports is conveniently effected by mounting each mirror in a rigid cell which lies within a shallow circular recess in the mirror support and is held therein by a clamping plate. The arrangement is such that the mirror can be rotated in this circular recess and clamped in any desired rotational position by the clamping plate, and by this means it is possible to obtain exact adjustment of the mirror in the following manner. If a mirror is found on test to be inaccurately mounted this inaccuracy can in most cases be corrected simply by rotating the mirror in its recess since the inaccuracy is probably due to a combined inaccuracy of the cell carrying the mirror and the base of the recess on which this cell rests so that by rotation of the mirror in the cell one inaccuracy can be caused to cancel the other. If, however, it is found that the inaccuracy cannot be corrected by such rotation, then the mirror is removed from the recess and the face of the cell is rubbed down so as to provide the desired inaccuracy in the level of this face to counterbalance the inaccuracy in the base of the circular recess in which it lies.

The adjustment of the zero mirror support relatively to the body part on which it is mounted is conveniently effected by providing parallel bearing surfaces on opposite side portions of the base of the support which rests on the flange or the like on the body part carrying the support, a tapered bore with a slot extending from one side thereof through the edge of the base being provided immediately behind one of these bearing surfaces and containing a correspondingly tapered pin which can be adjusted longitudinally in the bore, for example by a nut. In this way the pin can be caused to open the slot to a greater or less extent and thus vary somewhat the plane in which the adjacent bearing surface lies whereby adjustment of the support relatively to the body parts can be effected.

The movable mirror support carried by the zero mirror support on one of the body parts may be so connected to the other body part that pivotal movement is imparted to this support positively when relative rotational movement between the two body parts takes place, as is the case in known torsion meters of the kind referred to. Alternatively, however, according to a further feature of the present invention the movable mirror support pivotally mounted on one body part may be operatively connected to the other body part by a resilient connection while a dashpot or other damping device is provided tending to prevent rapid movements of the mirror about its pivot. With such an arrangement where the torque being transmitted fluctuates throughout each revolution of the shaft, the movable mirror support, by reason of the resilience of its operating mechanism and the effect of the damping device thereon, will tend not to move in accordance with such fluctuations but to take up a position corresponding to the mean torque being transmitted. The damping device may be of various forms but is preferably of the fluid type and comprises two disc-like parts or sets of disc-like parts arranged adjacent to one another with each disc-like part of one set lying adjacent to one or more disc-like parts of the other set and a viscous liquid between the disc-like parts, the arrangement being such that the disc-like parts are caused to rotate relatively to one another when the mirror support moves about its pivot. In some cases, in order to increase the damping effect, the adjacent faces of the disc-like parts may be provided with one or more annular ribs and depressions, each rib on one part being accommodated within a recess in the other part.

One disc or set of discs may be fixed while the other disc or set of discs is connected to the mirror, either directly or through suitable gearing or other mechanism, or both discs or sets of discs may be mounted to rotate about a common axis and so connected together and to the movable mirror support that when this support moves the two discs or sets of discs rotate in opposite directions.

The form of the resilient connection through which the movable mirror support is operated may also vary but in one form comprises a resilient arm which is disposed radially with respect to the pivot of this support and is connected at one end to the movable mirror support and at its other or free end to the body part not carrying the mirrors. Conveniently the free end of the resilient arm is coupled to the desired body part by means of a resilient strip disposed radially with respect to the axis of rotation of the body parts and connected at its outer end to the resilient arm and at its inner end to the body part, this strip being capable of bending in a plane parallel to the axis of rotation of the body parts but not in a plane at right angles to this axis.

Figure 9:
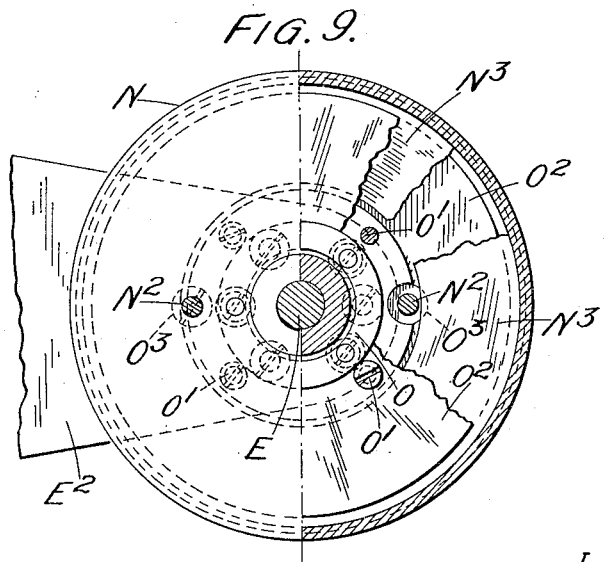

The invention may be carried into practice in various ways but one construction according to this invention together with a modification thereof is illustrated by way of example in the accompanying drawings, in which Figure 1 is a side elevation of one construction, Figure 2 is a section on the line 2—2 of Figure 1, Figure 3 is a plan view of the construction shown in Figure 1, Figure 4 is a section on the line 4—4 of Figure 1, Figure 5 is a side elevation showing certain details of the construction shown in Figure 1, Figure 6 shows in section a further detail of the construction shown in Figure 1, Figure 7 indicates how the mirrors are mounted and the adjustment of these mirrors effected, Figure 8 is a side elevation partly in section showing a modified construction, Figure 9 is a plan of part of the construction shown in Figure 8 with portions broken away, and Figure 10 is a diagrammatic view showing how the construction of mirror mounting according to the present invention may be applied to two relatively movable body parts of a torsion meter, for example, of the kind described in the specification of the present applicant's prior Letters Patent of the United States No. 1,781,560.

In the construction illustrated in Figures 1, 2, 3, 4, 5, and 6, A and B represent flanges respectively on the two relatively movable body parts of the torsion meter which are shown in full in Figure 10 and between which relative rotary movement takes place in accordance with the torsion in the shaft to which the torsion meter is applied.

Mounted on the flange A is a mirror-supporting frame comprising a base plate C which is rigidly secured to the flange by a bolt $A^1$ and has formed integral with it two spaced parallel mirror-supporting plates $C^1$. On the outer face of each of the spaced plates $C^1$ is formed a shallow cylindrical recess in which is disposed a rigid cell D carrying a mirror $D^1$, the cell being held in the recess by a clamping plate $D^2$ engaging the circumferential edge of the cell and held in position by screws $D^3$, and the arrangement being such that when the screws $D^3$ are slackened the mirror $D^1$ with its cell D can be rotated and then clamped in position by tightening the screws. Formed integral with and extending between the parallel plates $C^1$ is a transverse member $C^2$ mounted in the centre of which is a bearing $C^3$ having a tapered bore or cup constituting the bearing surface for the outer conical end of a pivot pin E. The inner conical end of the pivot pin E engages a tapered bearing cup in a bearing member $E^1$ mounted on the outer end of a resilient leaf spring $E^2$ the inner end of which is secured to the base plate C by a screw $E^3$, so that the resilience of the spring $E^2$ causes the bearing member $E^1$ to exert a slight endwise pressure on the pin E which maintains the ends of the pin always in close contact with the bearing members with which they engage.

Rigidly mounted on the pivot pin E is a plate-like mirror support F having shallow cylindrical recesses formed in its opposite parallel faces in each of which recesses is mounted a rigid cell $F^1$ containing a mirror $F^2$. The cells $F^1$ are held in position by clamping plates $F^3$ engaging the circumferential edges of the cells and secured by screws $F^4$ in a similar manner to that employed for the cells D.

The plate-like mirror support F has formed integral with it two arms $F^5$ which extend in a direction parallel to the axis of the pivot E and to a point beyond the outer end of the pivot which engages the bearing block $C^3$. Extending between the passing through these arms is an actuating rod G one end of which is secured to one of the arms while an intermediate point in its length is provided with a collar $G^1$ which fits closely within a bore in the other arm. The free end of the rod G passes through and is rigidly connected to the outer end of an L-shaped resilient member H, the inner end of which is secured by screws to a cylindrical block $H^1$ mounted in a bore J in a member $J^1$ which is secured by a bolt $B^1$ to the flange B.

It will be seen that with the arrangement so far described, when relative movement takes place between the flanges A and B the member H will act on the arm G to cause movement of the movable mirror-supporting plate F about the axis of its pivot E.

In order to permit of adjustment of the member G and hence of the initial angular position of the movable mirror support F, the block $H^1$ is mounted to slide in its bore J and is provided with a hollow internally screwthreaded projection $H^2$ as shown in Figure 4 which is engaged by an adjusting screw $H^3$ the head of which bears on the outer surface of the member $J^1$, a helical spring $H^4$ being interposed between the end of the bore J and the sliding block $H^1$ and tending always to move the block $H^1$ to the left in Figure 4 against the action of the adjusting screw $H^3$. It will thus be seen that by rotating the adjusting screw $H^3$ the position of the block $H^1$ in its bore can be varied while the spring $H^4$, by exerting a continued force in one direction on the sliding block, prevents any play in the screw. It is desirable that the block $H^1$ should be locked in position after adjustment and to this end a sliding locking member K is arranged in a bore disposed radially with respect to the bore J, this locking member being acted upon by a leaf spring $K^1$ which presses it always into contact with the sliding block so as to maintain this block always pressed against one side of the bore J. Formed in the locking member K is a tapered bore against one side of which can act the correspondingly tapered end of a locking screw $K^2$. It will thus be seen that when the screw $K^2$ is loosened the sliding block $H^1$ can be adjusted by the screw $H^3$ but will still be pressed by the locking member K against one side of its bore while, by tightening the locking screw $K^2$, the locking member K can be pressed tightly against the sliding block $H^1$ so as to hold it firmly against movement. The spring $K^1$ ensures that the position of the sliding block $H^1$ is unaffected by any looseness of fit between it and the bore in which it slides or by the tightening up of the locking screw $K^2$.

In apparatus according to the present invention as illustrated, the two fixed or zero mirrors $D^1$ must be truly at right angles to the plane in which they revolve with the torsion meter body part A, while the two moving mirrors $F^2$ must also when in their zero position be truly at right angles to this plane. It is practically impossible to contruct the parts of the apparatus so accurately as to achieve this end without providing some means for adjustment, and the adjustment of each of the mirrors is effected as follows. If a mirror is found on test not to be accurately mounted, this inaccuracy can probably be corrected by loosening the screws $D^3$ or $F^4$ of its clamping plate and rotating the mirror with its rigid cell in its recess, since the inaccuracy is probably due to a combined inaccuracy of the cell carrying the mirror and the base of the recess on which this cell rests so that by rotation of the mirror in the cell one inaccuracy can be caused to cancel the other. The manner in which this rotation effects adjustment is illustrated diagrammatically as applied to one of the mirrors $D^1$ in Figure 7 in which the inaccuracy in the cell D and the recess are accentuated for the sake of illustration. Thus the recess is shown as being of different depths at different points around its circumference while the cell is correspondingly inaccurate. It will be seen that when the cell is rotated in its recess the axis of the mirror will move round on the surface of a cone the apex of which lies on the reflecting surface. At two points in its rotation this axis will lie in a plane normal to the axis of rotation of the body parts of the torsion meter, this being the plane in which it is desired that the axis of the mirror should rotate. Thus by clamping the mirror in one of such positions the required adjustment is effected.

In some cases it may be found that the inaccuracy cannot be corrected by rotation of the mirror, and in this case the mirror is removed from the recess and the face of the cell is rubbed down so as to provide the desired inaccuracy in the level of this face to counterbalance the inaccuracy in the face of the circular recess in which it lies, the adjustment then being effected in the manner described above.

Each of the fixed or zero mirrors and of the movable mirrors may be adjusted in the manner indicated above.

It is desirable also, in order to allow for inaccuracy in the face of the flange A on which the base plate C rests, that means should be provided for adjusting the whole of the mirror-supporting apparatus relatively to this flange, and to this end the area of contact of the base plate C with the flange A is limited to two raised parallel edge portions $C^4$ of the face of the base which lies adjacent to the flange and a tapered bore $C^5$ is formed adjacent and parallel to one of these edge portions with a slot extending from this bore through the edge as shown in Figure 6. Disposed in the tapered bore is a correspondingly tapered pin L, one end of which is screw-threaded and engaged by a nut $L^1$ which is located in a slot $L^2$ extending transversely of the bore so that the nut can be rotated by a suitable spanner and will then act as a thrust member to move the tapered pin L longitudinally in the bore $C^5$. In this way it will be seen that the edge portion of the base plate can be slightly deformed or sprung to a greater or less extent so as to adjust within limits the plane in which the base plate C lies relatively to the plane of the flange A.

Figures 8 and 9 show a modified form of apparatus for operating and controlling the movement of the movable mirror support. The general construction of this mirror support is similar to that shown in Figures 1, 2 and 3 but instead of the mirror support F being operated by a rigid arm it is operated by a resilient rod M one end of which is rigidly connected to one of the arms $F^5$ while the other end passes through a bore in the other arm so that limited bending of the rod can take place without touching this other arm, the free end of the rod being connected to the member H as in the construction described above. Further, the movement of the movable mirror support F is controlled by a dashpot mechanism comprising a housing N rigidly connected to the lower end of the mirror support, and a boss O rigidly secured to the bearing member $E^1$. The lower end of the housing N is closed by a cover or lid $N^1$ through which pass screws $N^2$ whereby the whole housing and the lid are rigidly secured to the mirror support F. Rigidly connected by screws $O^1$ to the boss O are two spaced parallel plates $O^2$ which lie one on either side of and are spaced from an intermediate plate $N^3$ which is secured to the housing N, slots $O^3$ being formed in the plates $O^2$ to permit relative rotary movement between the housing N and the boss O without the screws $N^2$ fouling these plates. The housing is filled with a viscous fluid as shown and it will be seen that with this arrangement rapid movement of the movable mirror support F tends to be damped by the fluid between the fixed plates $O^2$ and the movable plate $N^3$ and the housing.

Thus in operation with the modification shown in Figure 8 the movable mirror support will, by reason of the resilience of the rod M and the damping effect of the dashpot device, tend to take up a position in accordance with the mean torque being transmitted at any time instead of in accordance with the instantaneous torque at any moment.

Figure 10 shows how a mirror mounting according to the present invention is applied to a torsion meter and how movement of the mirror in accordance with variations in torsion is indicated. Thus the torsion meter comprises a body part $A^2$ on which the flange A is formed, this body part being rigidly connected at a point $A^3$ to the shaft P, the torsion in which is to be measured, and a second body part $B^2$, on which the flange B is formed, rigidly connected at a point $B^3$ to the shaft P. It will be seen that when torsion takes place in the shaft relative rotary movement takes place between the two flanges A and B and that this relative movement will cause pivotal movement of the mirror support F about an axis radial with respect to the axis of the shaft P.

During operation of the torsion meter the whole torsion meter body with the mirrors on it revolves with the shaft P and a stationary lamp Q is provided adjacent to a scale $Q^1$, a ray of light passing from the lamp to a point where it will be reflected from the mirrors $F^2$, each time either of them comes into the path of the ray, onto the scale $Q^1$. When the mirror support F is in the position it occupies corresponding to no torsion in the shaft P, this ray will be reflected from each of the mirrors $F^2$ onto the zero point $Q^2$ of the scale $Q^1$ but when relative movement between the two flanges A and B causes pivotal movement of the mirror support the light ray will be reflected onto a part of the scale to the right or to the left of the zero point $Q^2$. Thus as the shaft rotates the light ray is reflected from the lamp Q by each of the mirrors $F^2$ onto the scale $Q^1$ once during each revolution of the shaft P and the position on the scale at which the ray traverses it indicates the torsion in the shaft.

It is to be understood that the constructions described above are given by way of example and that constructional details may be modified considerably without departing from this invention.

What I claim as my invention and desire to secure by Letters Patent is:—

1. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, and means whereby the support can be adjusted relatively to the body part on which it is mounted so as to enable the said plane to be caused to lie truly at right angles to the axis of rotation of the body parts.

2. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, means whereby the support can be adjusted relatively to the body part on which it is mounted so as to enable the said plane to be caused to lie truly at right angles to the axis of rotation of the body parts, a second and pivotal support, two mirrors carried by the pivotal support and lying back to back and in planes truly at right angles to a single plane in which lies the pivotal axis of the support, means on the zero mirror support for carrying the pivotal support with its pivotal axis substantially radial with respect to the axis of rotation of the body parts, and means whereby the pivotal support can be coupled to the other body part so that relative movement between the two body parts will cause pivotal movement of the pivotal support.

3. For use with a torsion meter of the kind referred to comprising two relatively movable rotatable body parts, a mirror mounting including in combination a zero mirror support adapted to be rigidly connected to one of the two relatively movable body parts and having formed in opposite sides thereof shallow cylindrical recesses, two zero mirrors, a rigid cell in which each zero mirror is rigidly mounted, each cell lying and being rotatable within one of the shallow cylindrical recesses, a clamping plate for securing each cell in its recess so that the two zero mirrors lie back to back and truly at right angles to a single plane, and means whereby the support can be adjusted relatively to the body part on which it is mounted so as to enable the said plane to be caused to lie truly at right angles to the axis of rotation of the body parts.

4. For use with a torsion meter of the kind referred to comprising two relatively movable rotatable body parts, a mirror mounting including in combination a zero mirror support adapted to be rigidly connected to one of the two relatively movable body parts and having formed in opposite sides thereof shallow cylindrical recesses, two zero mirrors, a rigid cell in which each zero mirror is rigidly mounted, each cell lying and being rotatable within one of the shallow cylindrical recesses, a clamping plate for securing each cell in its recess so that the two zero mirrors lie back to back and truly at right angles to a single plane, means whereby the support can be adjusted relatively to the body part on which it is mounted so as to enable the said plane to be caused to lie truly at right angles to the axis of rotation of the body parts, a second and pivotal support having formed in opposite sides thereof two shallow cylindrical recesses, a clamping plate for securing each cell in position, means on the fixed support for carrying the pivotal support with its pivotal axis substantially radial with respect to the axis of rotation of the body parts, a rigid cell rotatably mounted in each recess in the pivotal support, a mirror carried by each cell so that the mirrors lie back to back and in planes truly at right angles to a single plane in which the pivotal axis of the support lies, and means whereby the pivotal support can be coupled to the other body part so that relative movement between the two body parts will cause pivotal movement of the pivotal support.

5. For use with a torsion meter of the kind referred to comprising two relatively movable rotatable body parts, a mirror mounting including in combination a zero mirror support adapted to be secured to one of the body parts the area of contact being limited to two parallel edge portions of the face of the support which lies in contact with the body parts, this support having a tapered bore lying immediately behind and parallel to one of these bearing surfaces with a slot extending from one side of this bore through the adjacent edge of the base, a correspondingly tapered pin disposed within the bore, screwthreaded means for adjusting the tapered pin longitudinally in the bore so as to vary the width of the slot, and two zero mirrors so mounted on the zero mirror support as to lie truly at right angles to a single plane.

6. For use with a torsion meter of the kind referred to comprising two relatively movable rotatable body parts, a mirror mounting including in combination a zero mirror support adapted to be secured to one of the body parts the area of contact being limited to two parallel edge portions of the face of the support, this support having a tapered bore lying immediately behind and parallel to one of these bearing surfaces with a slot extending from one side of this bore through the adjacent edge of the base, a correspondingly tapered pin disposed within the bore, screwthreaded means for adjusting the tapered pin longitudinally in the bore so as to vary the width of the slot, two zero mirrors so mounted on the zero mirror support as to lie truly at right angles to a single plane, a second and pivotal support, two mirrors carried by the pivotal support and lying back to back and in planes truly at right angles to a single plane in which lies the pivotal axis of the support, means on the fixed support for carrying the pivotal support with its pivotal axis substantially radial with respect to the axis of rotation of the body parts, and means whereby the pivotal support can be coupled to the other body part so that relative movement between the two body parts will cause pivotal movement of the pivotal support.

7. For use with a torsion meter of the kind referred to comprising two relatively movable rotatable body parts, a mirror mounting including in combination a zero mirror support comprising a base portion and a mirror supporting portion, the base portion being adapted to bear on and be secured to the body part on which the support is mounted, the area of contact being limited to two parallel edge portions of the face of the base which bears on the body part, a tapered bore lying immediately behind and parallel to one of these bearing surfaces with a slot extending from one edge of this bore through the adjacent edge of the base, a correspondingly tapered pin disposed within the bore, screw-threaded means for adjusting the pin longitudinally within the bore, so as to vary the width of the slot, two rigid cells mounted so as to be rotatable in cylindrical recesses in the mirror supporting part of the zero mirror support, a zero mirror rigidly carried in each cell, a clamping plate for securing each cell in position in its recess so that the zero mirrors lie truly at right angles to a single plane, a second and pivotal support having formed in opposite sides thereof two shallow cylindrical recesses, a rigid cell rotatably mounted in each recess, a mirror carried by each cell so that the mirrors lie back to back and in planes truly at right angles to a single plane in which the pivotal axis of the support lies, a clamping plate for securing each cell in position, means on the fixed support for carrying the pivotal support with its pivotal axis substantially radial with respect to the axis of rotation of the body parts, and means whereby the pivotal support can be coupled to the other body part so that relative movement between the two body parts will cause pivotal movement of the pivotal support.

8. For use with a torsion meter of the kind referred to comprising two relatively movable rotatable body parts, a mirror mounting including in combination a supporting frame comprising a base plate adapted to be rigidly secured to one of the two relatively movable parts of the torsion meter body, and two spaced parallel mirror supporting plates extending from the base plate in planes at right angles to this plate and parallel to the axis of rotation of the torsion meter body, a zero mirror carried by the outer face of each of the parallel plates so that the two zero mirrors lie at right angles to a plane normal to the axis of rotation of the body parts, a part extending between the two parallel plates and constituting a bearing support, a movable mirror support, a pivot for the movable mirror support having its axis substantially at right angles to the axis of rotation of the body parts, one end of the pivot being carried in the bearing support, a separate member constituting a bearing for the other end of the pivot, two mirrors mounted on opposite faces of the movable support so that these mirrors lie back to back and truly at right angles to a single plane, and means whereby the movable support can be coupled to the other body part so that relative movement between the two body parts will cause pivotal movement of the movable support.

9. For use with a torsion meter of the kind referred to comprising two relatively movable body parts, a mirror mounting including in combination a zero mirror support comprising a base adapted to be secured to one body part and parallel mirror supporting plates extending substantially at right angles to the base, zero mirrors mounted on the outer faces of the mirror supporting plates so as to lie truly at right angles to a single plane, means for adjusting the base so that the said plane lies truly at right angles to the axis of rotation of the body parts, a part extending between the two parallel plates and constituting a bearing support, a movable mirror support, a pivot for the movable mirror support disposed radially with respect to the axis of rotation of the body parts, the outer end of this pivot engaging the bearing support, a second member on which the inner end of the pivot is carried, a part rigidly carried by the movable mirror support and extending outwards in a direction parallel to the axis of the pivot to a point beyond the bearing support for the outer end of this pivot, and an arm connected to such part and adapted to be coupled to the other body part whereby relative movement between the two body parts causes pivotal movement of the movable mirror support.

10. For use with a torsion meter of the kind referred to comprising two relatively movable body parts, a mirror mounting including in combination a zero mirror support comprising a base adapted to be secured to one body part and parallel mirror supporting plates extending substantially at right angles to the base, zero mirrors mounted on the outer faces of the mirror supporting plates so as to lie truly at right angles to a single plane, means for adjusting the base so that the said plane lies truly at right angles to the axis of rotation of the body parts, a part extending between the two parallel plates and constituting a bearing support, a movable mirror support, a pivot for the movable mirror support disposed with its axis substantially at right angles to the axis of rotation of the body parts, the outer end of this pivot engaging the bearing support, a second member on which the inner end of the pivot is carried, two arms extending outwardly from the movable support beyond the bearing support for the outer end of the pivot and lying one on each side of this bearing support and a rod-like member extending between and passing through the outer ends of these arms and adapted to be coupled to the other body part whereby relative movement between the two body parts causes pivotal movement of the movable mirror support.

11. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, means whereby the support can be adjusted relatively to the body part on which it is mounted so as to enable the said plane to be caused to lie truly at right angles to the axis of rotation of the body parts, a resilient operative connection between the movable mirror support and the other body part whereby relative movement between the body parts will tend to cause pivotal movement of the movable mirror support, and a damping device tending to prevent rapid movements of the mirror support about its pivot.

12. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, means whereby the support can be adjusted relatively to the body part on which it is mounted so as to enable the said plane to be caused to lie truly at right angles to the axis of rotation of the body parts, a resilient operative connection between the movable mirror support and the other body part whereby relative movement between the body parts will tend to cause pivotal movement of the movable mirror support, two disc-like parts arranged adjacent to one another, means for connecting one disc-like part to the zero mirror support, means for connecting the other disc-like part to the movable mirror support, and a viscous fluid between the disc-like parts whereby movement of the movable mirror support is damped.

13. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, means whereby the support can be adjusted relatively to the body part on which it is mounted so as to enable the said plane to be caused to lie truly at right angles to the axis of rotation of the body parts, a resilient arm connected at one end to the movable mirror support and adapted to be connected at its other end to the other body part of the torsion meter, and a damping device tending to prevent rapid movements of the movable mirror support about its pivot.

14. For use with a torsion meter of the kind referred to comprising two relatively movable rotatable body parts, a mirror mounting including in combination a zero mirror support adapted to be rigidly connected to one of the two relatively movable body parts, two zero mirrors so mounted back to back on the support as both to lie truly at right angles to a single plane, means whereby the support can be adjusted relatively to the body part on which it is mounted so as to enable the said plane to be caused to lie truly at right angles to the axis of rotation of the body parts, an arm disposed radially with respect to the pivoted mirror support and connected at one end to this mirror support, and a resilient strip disposed radially with respect to the axis of rotation of the body parts and connected at one end to the free end of the arm and at its other end to the other body part.

15. For use with a torsion meter comprising two relatively movable rotatable body parts, a mirror mounting including in combination a base plate adapted to be secured to one of the body parts, the area of contact being limited to two parallel edge portions of the face of the base which constitute bearing surfaces and rest on the body part, a tapered bore being formed in the base plate immediately behind and parallel to one of these bearing surfaces with a slot extending from one side of this bore through the adjacent edge of the base, a correspondingly tapered pin disposed within the bore, screw-threaded means for adjusting the pin longitudinally within the bore so as to vary the width of the slot, two parallel zero mirror supporting plates formed integral with and extending from the base at right angles thereto, a shallow cylindrical recess being formed in the outer face of each of these parallel plates, a rigid cell mounted and rotatable in each cylindrical recess, a zero mirror carried by each cell, a clamping plate for securing the cell in position, a part extending between the parallel plates, a bearing member carried by the said part, a movable mirror support, a pivot for such movable mirror support disposed with its axis substantially radial with respect to the axis of rotation of the body parts, the outer end of such pivot engaging the said bearing member, a bearing member for the inner end of the pivot resiliently carried by the base plate, two rigid cells mounted back to back in shallow cylindrical recesses in the movable mirror support so as to lie truly at right angles to a single plane, a mirror rigidly carried in each cell, a clamping plate for holding each cell in position in its recess, two arms on the movable mirror support extending outwards in a direction parallel to the pivot to a point beyond the bearing member engaged by the outer end of this pivot, a rod extending between and passing through these arms so that the free end of the rod extends towards the second body part which does not carry the mirror mounting, a connecting block mounted on the said second body part, an adjustable member mounted in a bore in said connecting block and a resilient strip extending radially with respect to the axis of rotation of the body parts and connected at one end to the adjustable member and at its other end to the free end of the rod, whereby relative movement between the two body parts causes movement of the pivotal mirror support about its pivotal axis.

In testimony whereof I have signed my name to this specification.

LEONARD GODFREY PINNEY THRING.